3,306,884
ISOTHIURONIUM SALTS
Thomas K. Dykstra and Donald A. Smith, Rochester, N.Y., assignors to Eastman Kodak Company, Rochester, N.Y., a corporation of New Jersey
No Drawing. Filed Feb. 10, 1965, Ser. No. 431,702
15 Claims. (Cl. 260—79.7)

This invention relates to isothiuronium salts, and more particularly to acrylic monomers and polymers containing isothiuronium groups.

One object of our invention is to provide monomers containing isothiuronium groups, and a method for preparing such monomers. Another object of our invention is to provide polymers containing repeating units which have isothiuronium groups. A further object of our invention is to provide a method for preparing polymeric mercaptans from polymers containing isothiuronium groups. Other objects of our invention will appear herein.

In accordance with our invention, we provide monomers having the following formula:

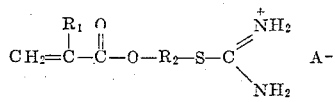

wherein $R_1$ is H or lower alkyl such as methyl, propyl or butyl, and preferably methyl or ethyl; $R_2$ is an alkylene group preferably of 2–5 carbon atoms, but which may contain up to 12 or more carbon atoms, such as propylene, butylene, hexylene, octylene and dodecylene; and, A is an anion, such as p-toluenesulfonate, methanesulfonate or halide. We have found that the monomers of the invention may be advantageously prepared by reacting, for example, a hydroxy-substituted alkyl acrylate with a suitable sulfonyl chloride, and then reacting the resulting sulfonate ester with thiourea. In a preferred embodiment, we prepare methacryloyloxyalkylisothiuronium p-toluenesulfonate by reacting a hydroxyalkyl methacrylate with p-toluenesulfonyl chloride to obtain methacryloyloxyalkyl p-toluenesulfonate, which is then reacted with thiourea.

In one embodiment of our invention, we provide polymers containing repeating units having the following formula:

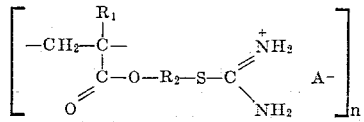

wherein $R_1$, $R_2$, and A have the same meaning as given above, and $n$ is a whole number, such as 5 to 100,000 or more.

In another embodiment of our invention, we provide copolymers having the repeating units described above together with repeating units from other acrylic monomers, such as the alkyl acrylates and alkyl methacrylates, wherein the alkyl group is from about 1–4 carbon atoms. Typical useful alkyl acrylates are ethyl acrylate and butyl methacrylate. Any of the monomers derived from acrylic acid may be copolymerized with the monomers of our invention. For example, the acrylamides, such as dimethylacrylamide, may be copolymerized with the monomers of the invention to provide useful products.

Our invention will be further illustrated in the following examples. Examples 1–4 illustrate the preparation of the monomers of our invention.

*Example 1*

2-(*methacryloyloxy*)*ethyl p-toluenesulfonate*.—A solution of 130.1 g. of 2-hydroxyethyl methacrylate in 316 g. of pyridine was cooled to 5°. With rapid stirring, 210 g. of p-toluenesulfonyl chloride was added in portions so that the temperature of the reaction mixture did not exceed 20°. The reaction mixture was kept at 0–5° for 8 hours and then treated with vigorous stirring with 2.5 N hydrochloric acid until the aqueous phase was acid to litmus. The oil phase was separated, diluted with 500 ml. of carbon tetrachloride and washed until neutral. After drying over magnesium sulfate, the solution was concentrated to an oil which was not further purified.

2-[2-(*methacryloyloxy*)*ethyl*]*isothiuronium p-toluenesulfonate* (*MIT*).—The above oil was combined with 500 ml. of alcohol, 76 g. of thiourea, and approximately 2 g. of hydroquinone. The solution was heated under reflux for 2½ hours and then kept at room temperature overnight. After concentration in vacuo, crystallization of a white solid occurred. This material was purified by successive recrystallizations from alcohol and then from water. Sample purified for analysis melted at 138–140°.

Calc.: C, 46.7; H, 5.6; N, 7.8; S, 17.8. Found: C, 47.0; H, 5.5; N, 7.6; S, 17.8.

*Example 2*

2-(*methacryloyloxy*)*ethyl methanesulfonate*.—A solution of 26.0 g. of 2-hydroxyethyl methacrylate in 60 g. of pyridine was treated with 0.5 g. of hydroquinone and chilled in an ice bath. Twenty-three grams of methanesulfonyl chloride was added dropwise so that the temperature did not exceed 20°. After keeping overnight at room temperature, the mixture was filtered and the filtrate poured into 200 ml. of water and ice containing 45 ml. of concentrated hydrochloric acid. Methylene chloride was added and the organic phase was separated and washed until neutral, dried over magnesium sulfate, and concentrated to an oil. This material was used directly in the preparation of the salt, although it could first be purified by molecular distillation.

2-[2-(*methacryloyloxy*)*ethyl*]*isothiuronium methanesulfonate* (*MIM*).—The above oil was combined with 15.2 g. of thiourea, dissolved in 150 ml. of alcohol, and refluxed for 3 hours. The solution was concentrated to an oil in vacuo, then treated with 150 ml. of ether. A solid separated which on recrystallization from acetonitrile weighed 29 g. and melted at 83–96°. Recrystallizations from acetonitrile and isopropyl alcohol raised the melting point to 129–132°.

Calc.: C, 33.8; H, 5.63; N, 9.87; S, 22.5. Found: C, 33.6; H, 5.60; N, 10.3; S, 19.0.

*Example 3*

3-*hydroxypropyl methacrylate*.—A solution of 228 g. of 1,3-propanediol in 304 g. of triethylamine was treated with one gram of hydroquinone and chilled to 0°. To this was added 104 g. of methacrylyl chloride over a period of one hour, keeping the temperature less than 10°. After two hours at room temperature, the mixture was treated with 500 ml. of ether and filtered. The filtrate was washed with four 250-ml. portions of water, then dried over magnesium sulfate and distilled, yielding 88 g. of oil; B.P. 75–90°/0.7 mm. The distillate was taken up in 50 ml. of benzene and washed with two 25-ml. portions of water, then dried and distilled, yielding 63 g. of product; B.P. 75–82°/0.7 mm., $n_D^{25}$ 1.4445.

Calc.: C, 58.3; H, 8.35. Found: C, 58.8; H, 8.50.

3-(*methacryloyloxy*)*propyl p-toluenesulfonate*.—A solution of 14.4 g. of 3-hydroxypropyl methacrylate in 50 ml. of pyridine was cooled to 0°, then treated with 0.5 g. of hydroquinone and 19.1 g. of p-toluenesulfonyl chloride. During the addition, the temperature was kept at less than 10°. The flask was placed in the refrigerator overnight, then the contents treated with 50 ml. of ice and water and 50 ml. of methylene chloride. To this mixture was added 30 ml. of concentrated hydrochloric acid with good stirring. The organic phase was separated, dried with magnesium sulfate, and concentrated in vacuo to give 23 g. of oil which soon crystallized to a semi-solid mass. This product was recrystallized twice from ether-hexane to give about 14 g. of pale rose colored crystals; M.P. 65–67°.

Calc.: C, 56.4; H, 6.05; S, 10.7. Found: C, 56.1; H, 6.00; S, 9.5.

*2 - [3 - (methacryloyloxy)propyl]isothiuronium p-toluenesulfonate (MPT).*—A solution of 13 g. of the above tosylate and 3.33 g. of thiourea in 40 ml. of alcohol was treated with a trace of hydroquinone and refluxed 15 minutes. After cooling, it was concentrated to an oil in vacuo and crystallized by the addition of ether. Two recrystallizations of this material from acetonitrile removed a considerable amount of insoluble polymer and yielded a material melting at 105–109°. Two further recrystallizations from water raised the melting point to 110–111.5°.

Calc.: C, 48.1; H, 5.9; N, 7.5; S, 17.1. Found: C, 47.8; H, 5.9; N, 7.1; S, 17.1.

Example 4

*4-hydroxybutyl methacrylate.*—1,4-butanediol was half acylated with methacrylyl chloride as before, yielding material boiling at 72–102°/0.7 mm., $n_D^{25}$ 1.4540. This was further purified by solution in benzene and washing with water, followed by distillation to give a product boiling at 104–112°/0.7 mm., $n_D^{25}$ 1.4533.

*2-[4-(methacryloyloxy)butyl]isothiuronium p-toluenesulfonate (MBT).*—A solution of 28.2 g. of 4-hydroxybutyl methacrylate in 55 g. of pyridine was treated as before with 34 g. of p-toluenesulfonyl chloride. From this reaction was isolated in the usual manner 48 g. of crude product. The isothiuronium salt was prepared from half of the above product by treatment with 6.0 g. of thiourea in 70 ml. of alcohol. By concentration of the solution in vacuo and treatment with ether, a 14-g. yield of crystalline material was obtained. Two recrystallizations from acetonitrile gave a product melting at 93–95°. Further recrystallization from water raised the melting point to 111–113°.

Calc.: C, 49.5; H, 6.2; N, 7.2; S, 16.5. Found: C, 48.3; H, 6.5; N, 7.2; S, 15.8.

Examples 5–11 demonstrate the preparation of polymers in accordance with our invention.

Example 5

*Poly(2-[2-(methacryloyloxy)ethyl]isothiuronium p-toluenesulfonate).*—A solution of 15 g. of MIT (Example 1) and 0.1 g. of potassium persulfate in 225 ml. of water was kept at 60° under nitrogen for 19 hours. The supernatant water was decanted and the separated polymer was dried in vacuo. Yield, 3.2 g.

Calc.: C, 46.7; H, 5.6; N, 7.8; S, 17.8. Found: C, 45.8; H, 5.5; N, 7.2; S, 17.2.

Example 6

*Poly(2 - [2 - (methacryloyloxy)ethyl]isothiuronium methanesulfonate).*—A solution of 15 g. of MIM (Example 2) in 200 ml. of t-butyl alcohol was prepared on the steam bath. To this was added 0.05 g. of azobisisobutyronitrile (ABIN) and the solution was heated for half an hour on the steam bath. The separated polymer was collected and washed with warm t-butyl alcohol, then ether, and dried in vacuo. Yield, 14.5 g.

Example 7

*Poly(2 - [3 - (methacryloyloxy)propyl]isothiuronium p-toluenesulfonate).*—A solution of 2.0 g. of MPT (Example 3) in 15 ml. of t-butyl alcohol was prepared on the steam bath. After the addition of 0.05 g. of ABIN, the solution was refluxed overnight. The separated polymer was dissolved in methanol, precipitated and washed in acetone, and dried in vacuo. Yield, 0.45 g.

Calc.: C, 48.1; H, 5.9; N, 7.5; S, 17.1. Found: C, 47.4; H, 6.4; N, 7.0; S, 16.4.

Example 8

*Poly(2-[4-(methacryloyloxy)butyl]isothiuronium p-toluenesulfonate).*—In a manner similar to that described in Example 7, 6 g. of MBT (Example 4) was polymerized in 130 ml. of t-butyl alcohol using 0.2 g. of ABIN as catalyst. The separated polymer was dissolved in methanol and a little water, precipitated and washed in acetone, and dried in vacuo. Yield, 0.5 g.

Calc.: C, 49.5; H, 6.2; N, 7.2; S, 16.5. Found: C, 48.6; H, 6.7; N, 7.0; S, 16.1.

Example 9

*Copoly(acrylic acid-ethyl acrylate-MIT) (20:70:10).*—A solution of 40 g. of acrylic acid, 140 g. of ethyl acrylate, 20 g. of MIT and 0.2 g. of ABIN in 700 ml. of dioxane and 50 ml. of water was kept at 60° under nitrogen for 22 hours. The polymer was isolated by precipitation in dilute acetic acid and weighed, after drying, 173 g. and contained 1.0 percent nitrogen, corresponding to 12.9 weight percent MIT in the polymer.

The above experiment was repeated using 40 g. of acrylic acid, 155 g. of ethyl acrylate, and 5 g. of MIT. The yield was 189 g. of material containing 0.4 percent sulfur, corresponding to 2.2 weight percent MIT.

Example 10

*Copoly(N,N-dimethylacrylamide-ethyl acrylate-MIT) (50:30:20).*—A solution of 50 g. of dimethylacrylamide, 30 g. of ethyl acrylate, 20 g. of MIT and 0.1 g. of ABIN in 325 ml. of dioxane and 30 ml. of water was kept at 60° under nitrogen for 22 hours. The turbid solution was poured into ether and the precipitated polymer dried in vacuo. The yield was 87.2 g. of material containing 8.0 percent nitrogen and 3.7 percent sulfur, indicating 20.6 percent MIT and 44.6 percent dimethylacrylamide in the polymer.

Example 11

*Copoly(n-butyl methacrylate-MIT) (90:10).*—A solution of 90 g. of n-butyl methacrylate, 10 g. of MIT and 0.2 g. of ABIN in 325 ml. of acetonitrile was kept at 60° under nitrogen for 24 hours. Since the solution did not have a very high viscosity at this point, a solution of 0.2 g. of ABIN in 25 ml. of acetonitrile was added and heating continued for an additional 19 hours. Polymer precipitated from the solution upon cooling and was purified by solution in acetone and precipitation in hexane. Vacuum drying gave 66.8 g. of material containing 2.1 percent sulfur which corresponds to 11.8 weight percent of MIT.

In the preparation of the monomers in accordance with our invention, we prefer to form a sulfonate of a ω-hydroxyalkyl acrylate. Advantageously, p-toluenesulfonyl chloride or methanesulfonyl chloride are employed to form the ester. However, a wide variety of reactants may be employed to form the ester. The reaction is preferably effected at low temperatures, such as less than about 0–5° C., in the presence of a basic catalyst, such as pyridine. The ester may then be reacted, with or without separation from the reaction mixture, with thiourea. This reaction is advantageously carried out at elevated temperatures, preferably by refluxing. It is desirable to incorporate an oxidation inhibitor, such as hydroquinone, to inhibit polymerization during this reaction.

The monomers of our invention may be polymerized alone, or together with other acrylic monomers to provide low to high molecular weight polymers. Advantageously, the polymerization is effected with catalysts of the free-radical-yielding type, such as a peroxide, hydroperoxide or ammonium persulfate. Typical useful catalysts are hydrogen peroxide, benzoyl peroxide, t-butylperoxide, and cumene hydroperoxide.

Silver images may be stabilized against oxidation by bathing developed photographic films, e.g., microfilms, in a solution containing the polymers of the invention. The polymers of the invention exhibit good antifoggant action in silver halide emulsions, and also inhibit vertical swell of photographic emulsions on treatment, for example, with developer, fix or wash solutions. Silver images developed from silver halide emulsions containing the polymers of the invention are stabilized against oxidative degradation.

The polymers of the invention may be formed into films, shaped articles or coatings and rendered insoluble by treatment with an alkaline oxidizing agent. These insoluble compositions may be rendered soluble again by treatment with a suitable reducing agent. Hence, coatings of the polymers have use in copying systems using differential hardening in image or non-image areas. The polymers of the invention can also be used as photographic antihalation coatings.

The homopolymers and copolymers of our invention have uses other than in photographic applications. The polymers and copolymers of the invention are mercaptan precursors in that upon exposure to a base the isothiuronium salt is converted to a mercaptan to provide polymeric mercaptans. This permits the preparation of soluble, stable polymers and copolymers which can be coated or incorporated into films and then converted into polymeric mercaptans by contacting with solutions of high pH. This procedure overcomes a serious obstacle in the preparation of polymers containing mercaptan or thiol functions in that it has always been extremely difficult to prepare such polymers due to the tendency of the mercaptan or thiol group to oxidize to the disulfide, giving rise to highly cross-linked insoluble polymers. Hence, the invention provides polymers which may be easily formed without the risk of cross-linking, and which may be used as an intermediate to prepare polymeric mercaptans. Polymeric mercaptans have a powerful effect on silver salts and find utility, inter alia, in photographic emulsions.

This invention has been described in detail with particular reference to preferred embodiments thereof, but it will be understood that variations and modifications can be effected within the spirit and scope of the invention as described hereinabove and as defined in the appended claims.

We claim:

1. Compounds having the following structural formula:

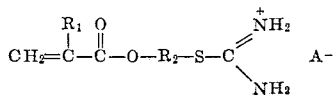

wherein $R_1$ is selected from the group consisting of hydrogen and alkyl, $R_2$ is alkylene and A is an anion.

2. 2-[2-(methacryloyloxy)ethyl]isothiuronium salt.
3. 2-[2-(methacryloyloxy)ethyl]isothiuronium p-toluenesulfonate.
4. 2-[3-(methacryloyloxy)propyl]isothiuronium salt.
5. 2-[4-(methacryloyloxy)butyl]isothiuronium salt.
6. Polymers having the following repeating unit:

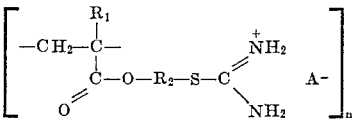

wherein $R_1$ is selected from the group consisting of hydrogen and alkyl, $R_2$ is alkylene, $n$ is a whole number, and A is an anion.

7. Poly(2 - [2 - (methacryloyloxy)ethyl]isothiuronium salt).
8. Poly(2-[2-(methacryloyloxy)ethyl]isothiuronium p-toluenesulfonate).
9. Poly(2 - [3-(methacryloyloxy)propyl]isothiuronium salt).
10. Poly(2-[4 - (methacryloyloxy)butyl]isothiuronium salt).
11. Copoly(acrylic acid-ethyl acrylate-2 - [2-(methacryloyloxy)ethyl]isothiuronium salt).
12. Copoly(N.N-dimethylacrylamide-ethyl acrylate - 2-[2-(methacryloyloxy)ethyl]isothiuronium salt).
13. Copoly(n-butyl methacrylate-2-[2 - (methacryloyloxy)ethyl]isothiuronium salt).
14. The process of preparing a polymerizable monomer having the following structural formula:

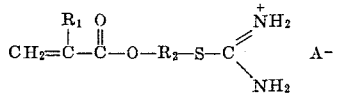

wherein $R_1$ is selected from the group consisting of hydrogen and alkyl, $R_2$ is alkylene and A is an anion which comprises forming a sulfonate ester of a compound having the following formula:

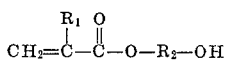

wherein $R_1$ and $R_2$ have the same meaning as given above and treating the reaction product with thiourea.

15. The process of claim 14 wherein the reaction of the sulfonate ester with thiourea is carried out in the presence of an oxidation inhibitor to prevent polymerization.

No references cited.

JOSEPH L. SCHOFER, *Primary Examiner.*

D. K. DENENBERG, *Assistant Examiner.*